United States Patent
Battlogg (10) Patent No.: US 11,136,807 B2
(45) Date of Patent: Oct. 5, 2021

(54) DEVICE HAVING A CONTROLLABLE ROTARY DAMPER, AND METHOD

(71) Applicant: INVENTUS ENGINEERING GMBH, St. Anton I.M. (AT)

(72) Inventor: Stefan Battlogg, St. Anton I. M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 64 days.

(21) Appl. No.: 16/615,291

(22) PCT Filed: May 18, 2018

(86) PCT No.: PCT/EP2018/063114
§ 371 (c)(1),
(2) Date: Nov. 20, 2019

(87) PCT Pub. No.: WO2018/215342
PCT Pub. Date: Nov. 29, 2018

(65) Prior Publication Data
US 2020/0087965 A1    Mar. 19, 2020

(30) Foreign Application Priority Data
May 20, 2017   (DE) .................... 10 2017 111 032

(51) Int. Cl.
*E05F 15/73*   (2015.01)
*E05F 15/76*   (2015.01)
(Continued)

(52) U.S. Cl.
CPC .............. *E05F 3/14* (2013.01); *E05F 15/622* (2015.01); *F16F 9/535* (2013.01);
(Continued)

(58) Field of Classification Search
CPC .......... E05F 15/622; F16F 15/03; F16F 9/145; B60R 21/013; B60Q 9/008; B60N 2/002; B60G 15/063
(Continued)

(56) References Cited

U.S. PATENT DOCUMENTS 5,944,376 A * 8/1999 Buchanan, Jr. ........ E05F 15/622
296/146.4
6,920,951 B2 * 7/2005 Song ..................... B60K 25/10
180/165

(Continued)

FOREIGN PATENT DOCUMENTS

CN      102937158 A     2/2013
DE   102006040211 A1   3/2008
(Continued)

*Primary Examiner* — Christopher P Schwartz
(74) *Attorney, Agent, or Firm* — Laurence A. Greenberg; Werner H. Stemer; Ralph E. Locher (57) ABSTRACT

A door component has a controllable rotary damper and two connector units which can be moved relative to one another. One of the two connector units can be connected to a load-bearing construction and the other one can be connected to a movable door device of a vehicle, in order to damp a movement of the door device between a closed position and an open position in a controlled manner. Two mutually engaged spindle units are arranged between the two connector units, one spindle unit being a threaded spindle and the other being a spindle nut. A first spindle unit is fastened rotatably on a coupling rod connected to one of the connector units. A magnetorheological transmission device is arranged between the coupling rod and the first spindle unit, in order to brake a rotational movement of the first spindle unit as required.

19 Claims, 4 Drawing Sheets

(51) Int. Cl.
*E05F 3/14* (2006.01)
*E05F 15/622* (2015.01)
*F16F 9/53* (2006.01)

(52) U.S. Cl.
CPC ..... *E05Y 2201/25* (2013.01); *E05Y 2201/258* (2013.01); *E05Y 2201/696* (2013.01); *E05Y 2900/531* (2013.01); *F16F 2224/045* (2013.01); *F16F 2228/066* (2013.01); *F16F 2232/06* (2013.01)

(58) Field of Classification Search
USPC ............... 188/266.5, 267, 267.1; 296/146.1; 49/334
See application file for complete search history.

(56) References Cited

U.S. PATENT DOCUMENTS

| | | | | |
|---|---|---|---|---|
| 7,225,905 | B2* | 6/2007 | Namuduri | F16F 9/535 188/267.1 |
| 7,275,750 | B2 | 10/2007 | Suchta et al. | |
| 8,109,371 | B2* | 2/2012 | Kondo | B60G 15/063 188/266.3 |
| 9,343,948 | B2* | 5/2016 | Kakiuchi | F16F 6/00 |
| 10,087,996 | B2* | 10/2018 | Berthelemy | H02K 1/22 |
| 2005/0269887 | A1* | 12/2005 | Blanding | F16H 25/2015 310/112 |
| 2006/0096815 | A1* | 5/2006 | Kondo | F16F 15/03 188/266.5 |
| 2009/0108546 | A1* | 4/2009 | Ohletz | B60G 15/063 280/6.16 |
| 2010/0132350 | A1* | 6/2010 | Hirai | B64C 25/24 60/327 |
| 2010/0308554 | A1* | 12/2010 | Kohlhauser | F16F 1/121 280/79 |
| 2012/0186920 | A1* | 7/2012 | Ogawa | F16F 15/03 188/266.1 |
| 2015/0345134 | A1 | 12/2015 | Takahashi et al. | |
| 2019/0346008 | A1* | 11/2019 | Battlogg | F16F 9/145 |
| 2020/0186005 | A1* | 6/2020 | Borgarelli | B64C 13/505 |
| 2020/0386032 | A1* | 12/2020 | Battlogg | B60N 2/002 |
| 2020/0386033 | A1* | 12/2020 | Battlogg | B60R 21/013 |
| 2020/0386034 | A1* | 12/2020 | Battlogg | B60Q 9/008 |
| 2020/0386035 | A1* | 12/2020 | Battlogg | B60Q 9/008 |
| 2020/0386037 | A1* | 12/2020 | Battlogg | E05F 15/611 |

FOREIGN PATENT DOCUMENTS

| | | | | |
|---|---|---|---|---|
| JP | 2009068571 | * | 4/2009 | ............... F16F 13/30 |
| WO | 2004001170 | A1 | 12/2003 | |

* cited by examiner

DEVICE HAVING A CONTROLLABLE ROTARY DAMPER, AND METHOD

BACKGROUND OF THE INVENTION

Field of the Invention

The present invention relates to an apparatus having a controllable rotary damper which comprises at least one magnetorheological transmission apparatus, and to a method.

A rotary damper having a magnetorheological fluid can be used in an advantageous manner. Magnetorheological fluids have, for example, very fine ferromagnetic particles, such as for example carbonyl iron powder, distributed in an oil. In magnetorheological liquids, use is made of spherical particles with a diameter of one to 10 micrometers owing to a production process, wherein the particle size is not uniform. If a magnetic field is applied to such a magnetorheological fluid, then the carbonyl iron particles of the magnetorheological fluid catenate along the magnetic field lines, such that the rheological characteristics of the magnetorheological fluid (MRF) are significantly influenced in a manner dependent on the form and intensity of the magnetic field.

Hitherto known apparatuses with a controllable rotary damper are often of complex design in order to satisfy the set requirements. Therefore, such apparatuses are not cheap to produce. Another difficulty here is for example that door dampers for motor vehicles and passenger cars compete with mechanical door arresters, which are produced millionfold and which are therefore optimized and inexpensive and which arrest an automobile door in two or three different angular positions.

SUMMARY OF THE INVENTION

It is therefore the object of the present invention to provide an improved and/or less-expensive apparatus with a controllable rotary damper based on magnetorheological action.

Said object is achieved by means of an apparatus and a method as claimed. Preferred refinements of the invention are the subject of the dependent claims. Further advantages and features of the present invention will emerge from the general description and from the description of the exemplary embodiments.

A first apparatus according to the invention is designed as a damper device and comprises two attachment units which are movable relative to one another and a controllable rotary damper in order to dampen a relative movement of the attachment units with respect to one another in controlled fashion. Between the two attachment units, are there are arranged two spindle units which are in engagement with one another, wherein one spindle unit is designed as a threaded spindle and the other spindle unit is designed as a spindle nut. A first spindle unit (and in particular the threaded spindle) is fastened rotatably on a coupling rod which is connected (indirectly or directly) to one of the attachment units. A magnetorheological transmission apparatus is arranged between the coupling rod and the first spindle unit (in particular the threaded spindle) in order to influence (and in particular brake) a rotational movement of the first spindle unit (as required).

Such an apparatus can be used in an advantageous and versatile manner in different technical fields (prosthetics, doors of buildings, doors of cupboards (for example in a kitchen) or items of furniture . . . ).

Another apparatus according to the invention is designed as a door component and has at least one controllable rotary damper and two attachment units which are movable relative to one another, wherein one of the two attachment units is connectable to a supporting structure and the other of the two attachment units is connectable to a movable door device, in particular of a (motor) vehicle, in order to dampen a movement of the door device at least partially between a closed position and an open position in controlled fashion. Two spindle units which are in engagement with one another are arranged between the two attachment units, wherein one spindle unit is designed as a threaded spindle and the other spindle unit is designed as a spindle nut. A first spindle unit (and in particular the threaded spindle) is fastened rotatably on a coupling rod connected to one of the attachment units. A magnetorheological transmission apparatus is arranged between the coupling rod and the first spindle unit in order to influence (and in particular brake) a rotational movement of the first spindle unit (in particular of the threaded spindle) (as required).

Said apparatus according to the invention is highly advantageous and can be used for example for damping a movement of an automobile door or of a tailgate or front hood etc., such that pivoting movements of doors about vertical and/or horizontal axes are possible.

In preferred refinements of all devices described above, the spindle units convert a linear movement of the attachment units relative to one another into a rotational movement of the spindle units with respect to one another.

Preferably, in the event of a relative movement of the attachment units with respect to one another, a relative axial position of the spindle units (of spindle nut and threaded spindle) with respect to one another changes.

In particular, the first spindle unit is designed as a threaded spindle and/or, preferably, the second spindle unit is designed as a threaded nut.

It is preferable if the spindle nut radially surrounds the threaded spindle.

In particular, the threaded spindle is designed to be at least 30%, and preferably 40% or 50%, longer than the spindle nut.

It is preferable if the magnetorheological transmission apparatus is arranged radially within the first spindle unit (and in particular the threaded spindle).

In all embodiments, it is preferable if the threaded spindle is rotatable relative to the spindle nut and relative to the coupling rod.

It is advantageous if an annular cylindrical cavity is formed radially between the coupling rod and the first spindle unit.

Preferably, a cylindrical sleeve composed of a magnetically conductive material is received in the first spindle unit and is connected rotationally conjointly to the first spindle unit.

Preferably, the cavity is filled with a magnetorheological medium.

It is advantageous if the first spindle unit (threaded spindle) is composed at least partially (or almost entirely, or entirely) of a plastic. This saves weight. Self-lubrication can also be achieved.

In particular, the magnetorheological transmission apparatus comprises at least one electrical coil and in particular a multiplicity of electrical coils.

Preferably, the electrical coil has windings wound around the coupling rod.

Preferably, the magnetorheological transmission apparatus comprises at least one magnetic circuit which comprises an axial portion in the coupling rod, an axial portion in the cylindrical sleeve and/or the first spindle unit (in particular threaded spindle), the electrical coil and, on at least one axial side of the electrical coil, at least one rotary body which is arranged in the radial gap between the coupling rod and the first spindle unit (preferably threaded spindle).

It is preferable if in each case at least one rotary body is arranged on both axial sides of the electrical coil.

In particular, a multiplicity of rotary bodies is arranged, on at least one axial side of the electrical coil, so as to be distributed over the circumference of the coupling rod.

In particular, the (or at least one) magnetic circuit comprises, on both axial sides of the electrical coil, rotary bodies arranged in the radial gap between the coupling rod and the threaded spindle.

Preferably, a multiplicity of magnetic circuits is formed.

It is preferable if at least one electrical cable such as a connection cable for the electrical coil is led through a channel in the coupling rod. The leadthrough of cables for sensors is also possible. A cable may also be led out at both ends or sides. Thus, in a usage situation on an automobile door, for example on the one hand in the direction of the door pillar or also into the inner part of the door.

Preferably, the coupling rod is pivotable about a pivot axle oriented transversely with respect to the coupling rod.

In particular, the first spindle unit (threaded spindle) is received in an axially fixed manner on the coupling rod.

In particular, the first spindle unit extends over the axial adjustment range.

It is preferable if a motor for driving the first spindle unit is included.

The method according to the invention serves for influencing a movement of a door device with a door component having at least one controllable damper device and having two attachment units which are movable relative to one another, wherein two spindle units which are in engagement with one another are arranged between the two attachment units. A movement of the door device at least partially between a closed position and an open position is controlled. Here, the damper device and/or a motor for driving one of the spindle units is controlled in order to achieve a guided door movement.

In particular, the method serves for influencing a door movement of a door device having an above-described door component with a damper device.

In a preferred embodiment of the method, the method serves for influencing a door movement of a door device having an above-described door component with a damper device. Here, the door component comprises in particular one or preferably a first and a second spindle unit and preferably at least one motor for driving the first spindle unit. The motor, designed in particular as an electric motor, and the damper device are interconnected such that a haptically advantageous guided door movement is made possible.

In refinements of the method or of the methods, features as described above are present.

Comments will be given below regarding the construction, the function and the method of implementation:

Magnetic circuit: a magnetic circuit forms around any coil. The magnetic circuit is closed in particular via the two (adjacent) rolling bodies, the coupling rod and a sleeve (tube). All parts of the magnetic circuit are particularly preferably ferromagnetic; the magnetic characteristics are normally of lesser importance in the case of the other parts. Only those parts which would otherwise cause a "magnetic short circuit", that is to say a secondary path for the magnetic field past the rolling bodies (such as in particular the ball bearing or deep-groove ball bearing, the holder of the sealing ring or of the shaft sealing ring and a stop ring) must be non-ferromagnetic.

The sleeve bears against the inside of the threaded spindle. The sleeve is not necessary if the threaded spindle itself is ferromagnetic. Owing to the sleeve, however, the threaded spindle does not require ferromagnetic characteristics and can be entirely optimized for good sliding characteristics/cheap production/service life.

In the case of the construction illustrated in the exemplary embodiment, multiple preferably coil/rolling body assemblies are used. The construction analogously also functions with only one coil and/or one rolling body (per coil). Through the use of multiple electrical coils, the flux density at critical points (coupling rod, sleeve) can be reduced, and the entire construction can be made thinner. It would however also be conceivable to generate the same torque with only one (long) coil and one (long) rolling body.

It is important for the coils to be fixedly fastened on the coupling rod and to thus be static relative thereto (or to the bodyshell in the case of a door component). This facilitates the electrical connection. The spindle nut is also static; only the spindle (and the ferromagnetic sleeve therein) rotates—along with possibly also a few small parts such as drilled nuts.

There may be bores in the coupling rod which run transversely or else in a zigzag pattern. These are possibilities for connecting the individual coils to one another without affecting the raceway of the rolling bodies. It is also possible for an axial channel to be formed on the surface of the coupling rod. Here, a ring can also be pushed (as raceway or sealing point) over such an axial channel. It is also possible to provide an axial central bore with radial bores to the individual coils.

The question of whether the coils are laid out in series or parallel or each connection is laid out individually is dependent on the usage situation and the desired characteristics. All variants are possible. It may be advantageous for the coils to have different electromagnetic characteristics. In particular, coils with the same shape/same dimensions may be wound differently (different wire thickness+number of windings, different material).

The coils may (though need not) have coil carriers. A coil carrier or coil holder is not imperatively necessary; use may also be made of air coils, or the coils may be wound directly onto the coupling rod (which can also be referred to as a shaft). Here, lateral delimitations (disks, stop rings) may be used instead of a coil carrier.

The coils may be potted (sealed) or may be open and then in contact with the magnetorheological fluid (MRF). The coils may be threaded as finished components onto the coupling rod, which is preferably of circular form, or may be wound directly on the coupling rod.

It is advantageous if a plug connector (plug) is situated on the coil carrier (also referred to as coil holder) or a part of the carrier forms such a plug connector (plug).

In addition to the coils or instead of a part of the coils, magnetically hard material may also be part of the magnetic circuit, and thus generate a defined base torque without electrical current. Such a magnetically hard material is provided preferably in the region of the coupling rod and/or of the sleeve. The magnetically hard material may be a permanent magnet, the permanent magnetic field of which can have a dynamic field of a coil superposed thereon.

Alternatively, remanence may be used, where permanent magnetization of the material is set by means of (short) electrical pulses.

An intermediate ring is preferably provided between adjacent magnetic circuits. Alternatively, use may also be made of two rolling bodies without an intermediate ring in between, or of one single, relatively long rolling body. The relatively long rolling body is, at one end, part of one magnetic circuit and, at the other end, part of the other magnetic circuit.

Grooves may be provided under the rolling bodies. Said grooves are not imperatively necessary. They however locally increase the flux density and thus make it possible to transmit a higher torque radially at the inside.

(Rubber) rings may also be placed into the grooves in order to define the position of the rolling bodies in the gap and force a rotation of the rolling bodies, because said rings prevent slippage on the inner diameter. It is also possible for multiple grooves to be provided per rolling body.

The preferred (construction illustrated in the exemplary embodiment) has the advantage that, at one end, there is only one plain bearing/screw-in part. The electrical connection is realized through the shaft in the direction of the pivot axle.

Alternatively, the electrical connection may also be realized in the screw-in part. The screw-in part may be fixedly connected to the coupling rod (in order that the plug is static relative to the door component). The electrical connection may then be realized analogously to other components of the door (window regulator, loudspeakers, lighting, wing mirror adjustment means).

In particular, the screw-in part is also suitable for accommodating not only the plug but also (simple) electronics. Here, the electronics may also include a sensor; said sensor is intended to determine the opening angle of a door. Here, the relative movement (rotation) of the spindle unit with respect to the coupling rod may be measured.

In one specific embodiment, a cylindrical coupling rod or a coupling tube is connected, non-rotatably about the longitudinal axis, to the bodyshell (A or B pillar). The rod end may however pivot, in the connecting part, relative to the door (articulatedly mounted).

Between said cylinder part and the spindle inner side, there is fitted at least one magnetorheological transmission apparatus (an MRF wedge-type bearing element), wherein rolling bodies or ball bodies, electrical coils, stop disks and cables are used. On the outer side of the spindle, there is a multi-turn thread. This is operatively connected to a non-rotating spindle nut by means of the thread turns. The spindle nut is mounted, preferably pivotably, in the vehicle door by means of a bracket.

Depending on the electrical energization of the magnetorheological transmission apparatus ("MRF wedge-type bearing"), the force that has to be imparted in order for a longitudinal movement to take place/be possible varies.

Here, use may also be made of a ball screw spindle, recirculating-ball spindle or coated spindle.

A frictionally locking connection is also possible.

The invention permits a simple design (low cost), wherein it is the aim to design an apparatus or a door component with rotary damper (door pivoting brake) which can be produced as inexpensively as possible. With such an apparatus, numerous functions are possible, such as, for example in the case of a door component, stopping before hitting an obstruction, antipinch protection (finger, hand . . . ). Certain sensors are however required for this purpose (near-field detection). In most vehicles, such sensors are not present or are of a quality or design which is not sufficient for the flawless door opening function. Thus, the numerous possible functions of the adaptive door damper can then only be utilized to a limited extent.

It is advantageous for available information items to be utilized such that an increased functional scope of the door component can thus be achieved. This means utilizing information items such as:

position of the vehicle in space (longitudinal or transverse inclination; for example signal from airbag or ABS control unit), approaching pedestrian or cyclist (from the parking sensor), door locked or not (lock sensor or contact between door and bodyshell)

seat information (driver seated on the seat and disembarks; seat contact from the airbag or the seat heater)

key information (customer is outside the automobile and wishes to enter)

These data can be evaluated and assigned corresponding electrical current values at the rotary damper. It is possible here to dispense with "expensive electronics" in the conventional sense.

A constant electrical current plus the "MRF wedge-type bearing" may be used. In the case of a "constant electrical current" (during the movement of the door, the electrical current or the electrical current intensity (amperes) is not varied), the "special" characteristic of the MRF wedge-type brake is utilized. That is to say, during movement, the braking force decreases; said braking force is very high in a standstill state. Accordingly, the door can be easily moved to the desired end position by the driver. As soon as the door is left in a stationary position, the braking force automatically increases (wedge effect or wedge characteristic curve), and the door is fixed.

As an alternative to this, or also in combination, a rotary encoder in the door hinge, a longitudinal encoder between door pillar and door, a near-field sensor (optical sensor which monitors the door movement) may be used for position detection.

A local sensor which determines the opening angle of the door offers many advantages. There are numerous possibilities for directly measuring said opening angle or deriving it from linear or rotational movement (by potentiometer, capacitively, inductively, magnetically etc.).

EXAMPLE 1

Sensor on the pivot axle of the shaft

In a preferred solution, measurement is performed using a potentiometer. This is an inexpensive solution, though robust potentiometers are required. It is however alternatively possible, at the same position, for a Hall sensor, for example, to (contactlessly) measure the spacing of a magnet or the flanks of a toothed gear.

EXAMPLE 2

Sensor linear: The movement of the threaded spindle relative to the spindle nut. Here, the existing tooth structure can be sensed, preferably by means of an encoder, which can also interpolate. In this way, a relatively high resolution is possible, but an expensive sensor is also used.

EXAMPLE 3

Sensor measures rotational movement in the screw-in part (or drilled nut).

Advantage: a relatively high resolution owing to the pitch of the spindle unit (with the same physical solid measure). A fraction of one rotation at the pivot axle (example 1, <90°) thus yields for example 3 complete rotations over the entire stroke. Additionally, the (at least partially protected) region within the screw-in part can moderate a part of the environmental conditions, resulting in lesser demands on the sensor construction.

Ideally as an encoder, possibly as a low cost solution without interpolation. Example optical encoder as forked light barrier, which senses a tooth structure connected to the spindle. For the "low-cost" attribute, it is expedient to utilize the greatest possible number of synergies. A sensor on the pivot axle probably requires a housing, a plug and a cable. In the worst case, also a circuit board with a pair of additional components (protective functions, signal preparation).

In the region of the screw-in part, the sensor could be part of a small electronics assembly (activation, connection of coils, plug connection to the vehicle).

With regard to electronics: "constant electrical current" offers many advantages. It is possible for an existing control unit to perform the activation of the doors, though the realization may be more complex than implementing a separate small activation means.

It is possible to use a control unit which is present which directly activates the actuator or multiple actuators. Since not only logic levels are switched but a certain amount of power is also required, a corresponding control unit is necessary.

It is preferable for a minimal expenditure of "intelligence" to be used, entirely without a control unit, that is to say similarly to a window regulator, for example the actuators have no considerable advantage over existing systems.

In an existing/central control unit, it is possible to utilize synergies, for example polarity reversal protection for the supply or else a multi-channel switch (=IC with multiple switches) for all actuators.

This is expedient and offers numerous technical advantages.

A dedicated control unit is advantageous and permits dedicated activation for each actuator and ideally directly at or in the actuator. For example, in the region of the screw-in part, such that no housing is required (and no plug connector to the coils, because these can be directly soldered on). An advantage is that the activation of the actuator is possible directly with PWM, because a short connection to the coils is possible and the construction is shielded by the housing. A separate control unit is furthermore advantageous if a sensor is also integrated. This can use common resources (supply, circuit board, protective circuit, plug connection).

A modular concept is possible; all that is required for operation is on/in the actuator, only a plug connection to the vehicle (supply).

The control unit can permit real-time closed-loop control of the door damper using simple means; autonomous operation is possible with one sensor.

Global information can be exchanged via a bus (spatial position of vehicle, obstruction . . . ). This permits a better coordination of the function and additional possibilities. Information items relating to the door damper can also be fed back to the vehicle (sensor, diagnosis . . . ). LIN is expedient for such applications, though analogue control voltages, simple digital commands or more complex communication via bus systems are also conceivable.

A further variant is a combination in which a central control unit is used but the power electronics are at the actuator. Activation is then preferably performed without power (analog or digital).

If, in the case of constant electrical current, it is the intention to be able to set only a small number of predefined electrical current levels, an interesting approach is to be able to individually switch the coils. This functions in the manner of a heating fan: one heating loop=half power, both heating loops, full power. On the other hand, multiple switches are required.

It is also possible to construct a closed-loop electrical current controller which can output different electrical current intensities. In the simplest case, various switches with different series resistances are sufficient. This approach has limitations with regard to energy efficiency and flexibility. Such a solution is highly dependent on external parameters (supply voltage, temperature . . . ). These can, in part, be compensated (for example voltage stabilization), wherein the outlay for this would however be greater than simply implementing a supply which can be controlled in continuously variable, closed-loop fashion.

A continuously variable electrical current output is possible. In the simplest case, by means of a linear closed-loop controller, but here, energy that is not required is "lost as heat". This could be acceptable in this usage situation because relatively low electrical current can be expected (500 mA). The activation means must be able to drive the maximum electrical current even in the worst case.

Alternatively, a clocked/switched closed-loop electrical current controller may be implemented. For this purpose, however, additional components (switches, inductances, capacitors are required).

By contrast to multiple electrical current stages which can be set by means of multiple switches, one switch suffices for the continuously variable activation.

In summary:
1. Switch binary: on or off, 2 states per switch
   With n switches $2^n$ states: 2 switches for 4 stages, 3 switches for 9 stages—but only if the stages can be switched in a skilful manner.
2. Switch continuously variable: linear operation, linear closed-loop control
   The switch can assume any intermediate states, the resistance is of the switch element is controlled such that the desired voltage/electrical current/power prevails at the actuator. Energy that is not required is "lost as heat" in the switch.
3. Switch binary, fast clocking: PWM
   Fast switching on and off controls the power prevailing, on average, at the actuator. Frequency outside the perceptible range, additional components smooth the output signal (EMC).

It must be observed here that, instead of closed-loop electrical current control, it is very likely that closed-loop voltage control or open-loop voltage control is also sufficient. The resistance of the coil does not change to a great extent (only slightly owing to the temperature).

Manufacturing tolerances are probably more critical. These can however be specified, and/or a calibration can be performed after the manufacturing process.

The previous approaches are based on a switch which, in the activated states, closes the electrical current circuit and thus permits the electrical current flow through the actuator. If the switch is opened while electrical current is flowing in the coil, a freewheeling diode enables this to continue circulating. The electrical current is slowly depleted by means of the resistances that are present.

For a fast load dump (electrical current back to zero), a full bridge is advantageous. By means of this, the electrical current direction can be reversed, whereby the electrical current falls very quickly. For a low-cost solution, this approach is too complex, in particular because no further advantages can be attained from a reversal of the electrical current direction.

Alternatively, the resistance in the freewheeling path may also be increased by means of other elements (resistance, Zener diode . . . ). In this way, the losses upon switching off increase, the electrical current falls more quickly.

Further advantages and features of the present invention will emerge from the exemplary embodiments, which will be discussed below with reference to the appended figures.

DESCRIPTION OF THE INVENTION

Figure 1:
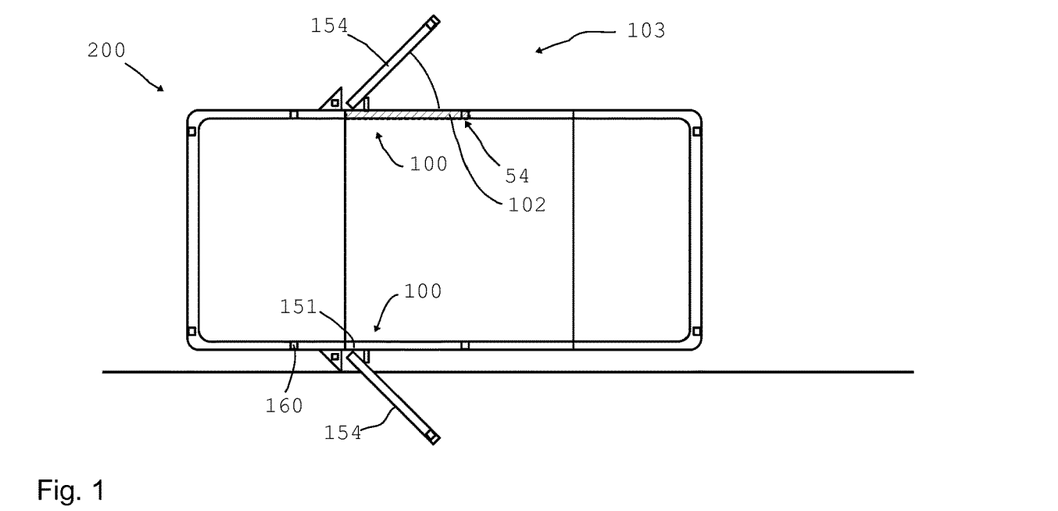
FIG. 1 shows a highly schematic plan view of a motor vehicle with an apparatus with a rotary damper.

Here, FIG. 1 shows the use of the apparatus 50 according to the invention as a door component 100 on a motor vehicle 200, and in this case a passenger car. The motor vehicle 200 is illustrated is in a schematic plan view from above. Here, two door devices 154 designed as doors are provided on the motor vehicle 200. The doors are both situated in the open position 103. Hatching is used to show one door in the closed position 102.

To dampen the pivoting movement of the doors 154, door components 100 are provided which each comprise a rotary damper 1. The door components each comprise attachment units 151 and 152, of which one is attached to a supporting structure of the motor vehicle 200, while the other is connected to the door 154, such that a relative movement of the attachment units 151 and 152 occurs during an opening or closing movement of the door 154. The attachment units 151 and 152 move linearly. A conversion into a rotational movement occurs, which is dampened by the rotary damper 1 of the apparatus 50.

The apparatus 50 may be designed as a door component 100 and comprise the rotary damper 1 and attachment units 151 and 152 and be used for damping the rotational movement of doors and flaps on a motor vehicle 200. The apparatus 50 may also be directly designed as a damper device 50 and comprise the rotary damper 1 and attachment units 151 and 152 and be used for damping rotational movements, or for example linear movements, between the attachment units 151 and 152.

Figure 2:
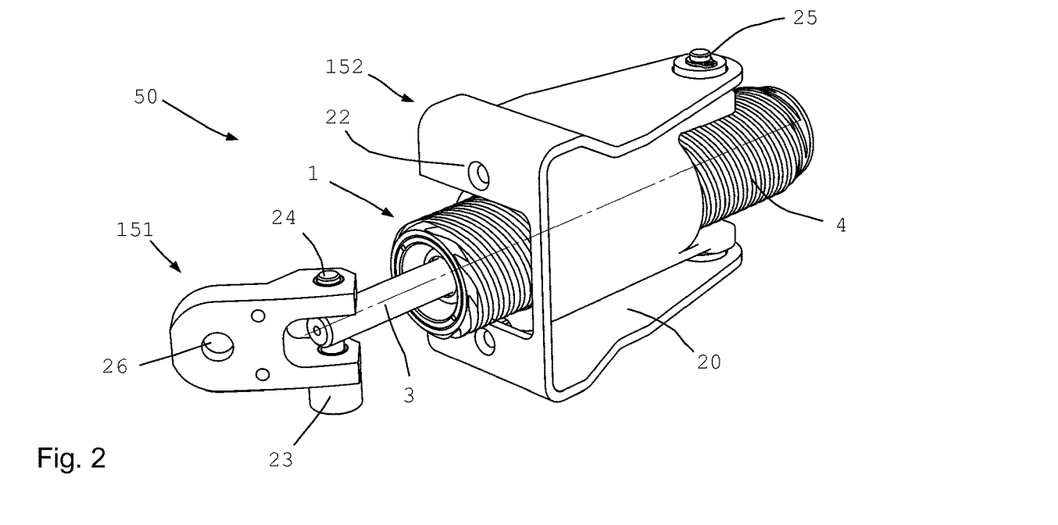
FIG. 2 shows an apparatus with a rotary damper in a perspective view.

FIG. 2 shows a perspective illustration of the apparatus 50, wherein the apparatus 50 comprises a rotary damper 1.

The apparatus 50 may be designed as a damper device or else as a door component 100 and thus serves for use on the motor vehicle 200 from FIG. 1 or for other uses.

The apparatus 50 comprises a first attachment unit 151 and a second attachment units 152, which may be arranged at the opposite ends. It is however also possible, as shown in FIG. 2, for the attachment unit 152 not to be arranged or mounted at the physical end of the apparatus 50.

The apparatus 50 comprises a coupling rod 3, which projects into the rotary damper 1. At the outer end of the coupling rod 3, there is provided a pivot axle 24, pivotably about which the coupling rod 3 is received. The first attachment unit 151 is articulatedly mounted at the pivot axle 24. Here, on the attachment unit 151, there is formed a fastening bore 26 which, in the case of use as a door component 100, serves for example for the fastening to a door pillar. An angle sensor 23 (designed for example as a rotary encoder) may also be arranged at the pivot axle 24.

The coupling rod may have any desired three-dimensional contour, that is to say need not be straight. This facilitates installation in constricted space conditions.

The second attachment unit 152 is in this case arranged in the central region of the apparatus 50 and comprises a fastening bracket which is arranged so as to be pivotable about the pivot axle or the joint 25. The bracket 20 surrounds the spindle unit 4, which is designed as a threaded spindle here.

Figure 3:
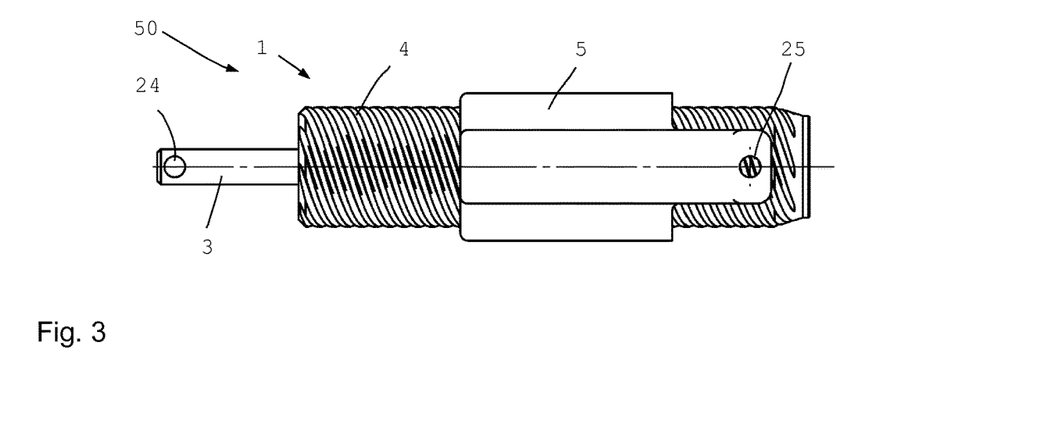
FIG. 3 shows a plan view of the apparatus as per FIG. 2.

FIG. 3 shows a plan view of the apparatus 50, in which it is possible to see the second spindle unit 5, which in this case is designed as a spindle nut and which is in engagement with the first spindle unit 4. The spindle unit 4 is arranged fixedly in an axial direction on the coupling rod 3. The threaded spindle 4 is however arranged rotatably about the coupling rod 3, such that, in the event of a relative axial displacement of the two attachment units 151 and 152 relative to one another, the spacing of the attachment units 151 and 152 changes, and therefore the spindle nut 5 held rotationally fixedly on the attachment unit 152 causes a rotational movement of the threaded spindle 4 about the coupling rod 3. As a result, the spindle nut 5 can axially displaceable on the threaded spindle 4, whereby for example an opening or closing of the door of a motor vehicle is made possible. The spindle units 4 and 5 convert a linear movement into a rotational movement.

Figure 4:
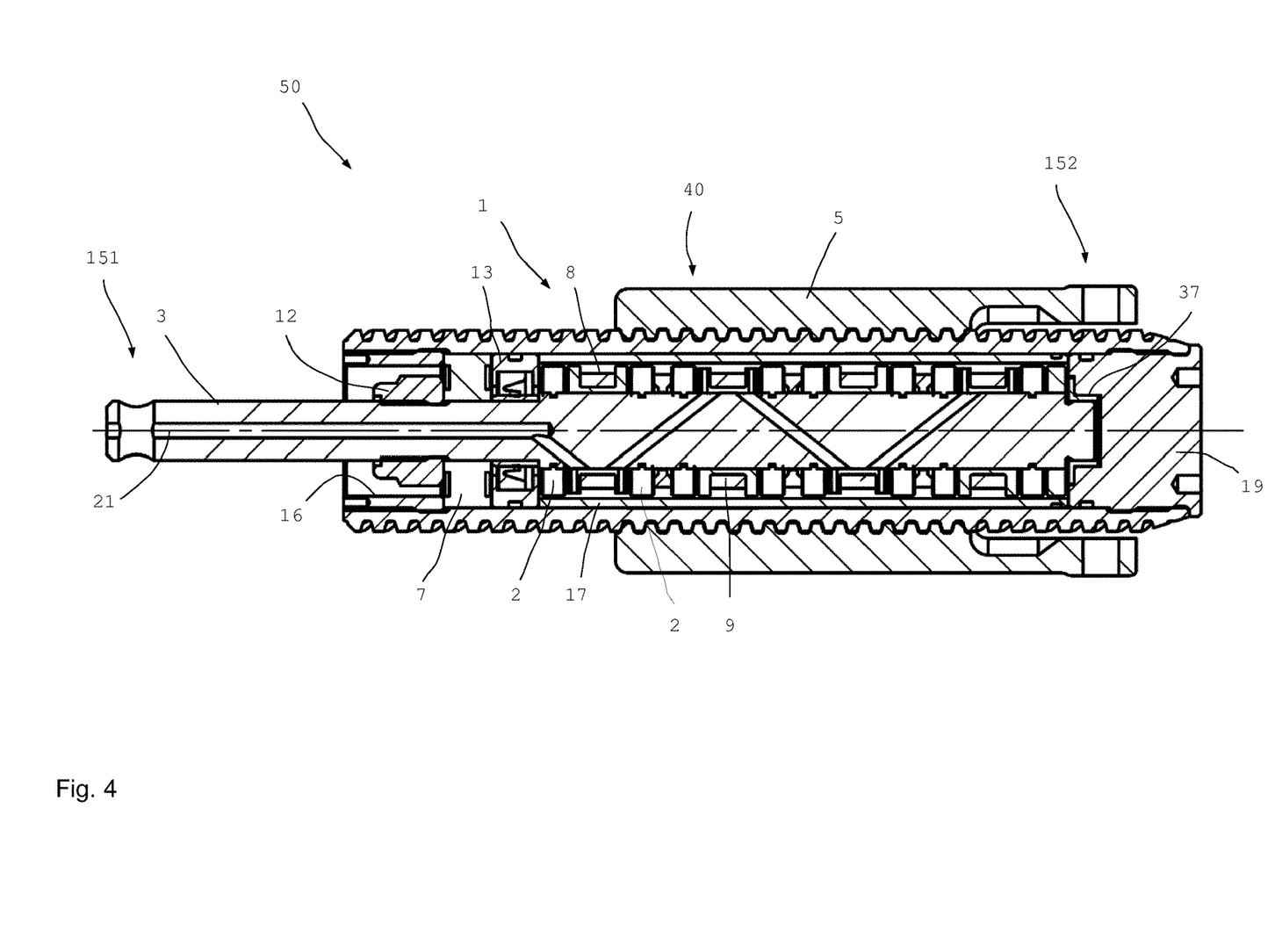
FIG. 4 shows a section through the apparatus as per FIG. 2.

FIG. 4 shows a section through the apparatus 50, wherein the attachment unit 151 is attached to the in this case left-hand end of the coupling rod 3.

The threaded spindle 4 is mounted rotatably about the coupling rod 3 at the left-hand end by means of a bearing 7 designed as a rolling bearing and at the right-hand end by means of a bearing 37 designed as a plain bearing. The bearings 7 and 37 are arranged in the semicylindrical interior space between the threaded spindle 4, which is of hollow form, and the coupling rod 3.

At one end, a threaded nut 12 is screwed onto the coupling rod in order to fix the inner ring of the rolling bearing 7 in an axial direction. Correspondingly, a drilled nut 16 is screwed into the same end into the hollow threaded spindle 4 in order to axially fix the outer ring of the rolling bearing 7.

Here, at the other end, a screw-in part 19 is screwed into the hollow end of the threaded spindle 4 and, there, completely closes the opening of the threaded spindle 4. The plain bearing 37 is in this case formed or inserted on the screw-in part 19.

Here, in the interior of the hollow spindle nut 5, there is inserted a sleeve 17 which is rotationally conjointly connected, and for example adhesively bonded or fixed in positively locking fashion, to the threaded spindle 4. The use of a sleeve 17 composed of a ferromagnetic material makes it possible for the threaded spindle 4 itself to be produced for example from a plastic. This leads to a considerable weight saving. Furthermore, in this way, self-lubrication of the thread regions, which engage into one another, of the spindle nuts 4 and 5 can be achieved, such that the apparatus 50 can be operated without maintenance.

Arranged adjacent to the rolling bearing 7 is a seal 13, which comprises for example a shaft sealing ring and which seals all gaps by way of contact. Since the coupling rod 3 is preferably composed of a ferromagnetic material and for example a relatively soft steel, a race 28 composed of a hardened or coated (for example hard chromium) material is preferably applied to the coupling rod 3 in the region of the seal 13 in order to prevent wear.

In the interior, a multiplicity of magnetic circuits is preferably accommodated in the cavity between the coupling rod 3 and the sleeve 17 (if the threaded spindle is composed of plastic, for example) or the inner wall of the threaded spindle 4 (if this is composed of a ferromagnetic material and no sleeve 17 is present) and the outer surface of the coupling rod 3. For this purpose, in the hollow-cylindrical interior space, electrical coils 9 are either wound directly onto the coupling rod 3 or are wound onto coil holders 11, which are subsequently pushed onto the coupling rod 3.

Adjacent to the electrical coils 9, preferably on each axial side, there is accommodated a multiplicity of rotary bodies or rolling bodies 2, by means of which the magnetic field of the magnetic circuit is closed. For example, 8 or 10 rotary bodies 2 may for example be arranged so as to be distributed over the circumference at one axial position.

Figure 5:
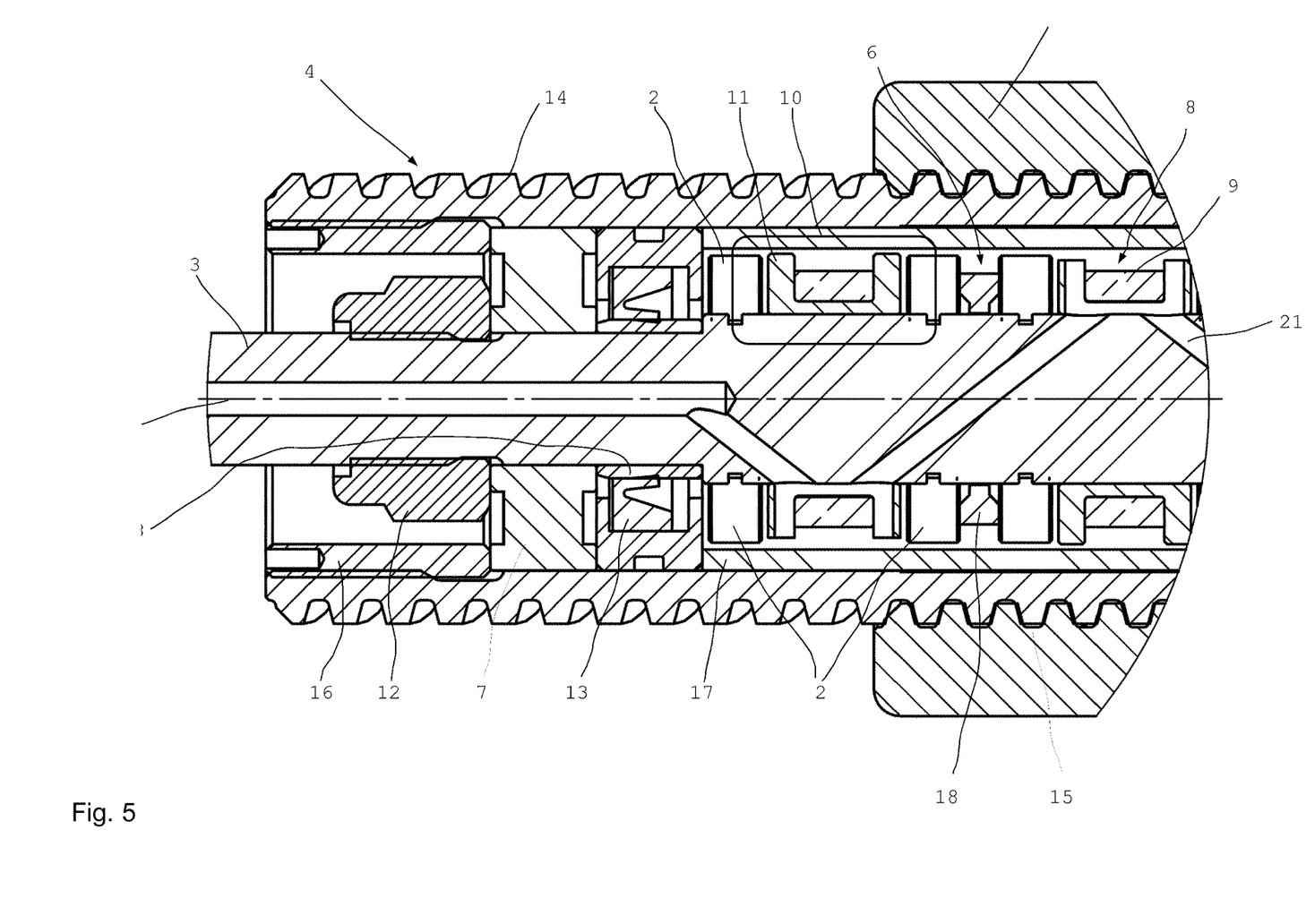
FIG. 5 shows an enlarged detail from FIG. 4.

FIG. 5 shows an enlarged detail from FIG. 4, wherein, here, the profile of the magnetic field 10 or a field lines of a magnetic circuit is shown by way of example.

The magnetic field generated by the electrical coil 9 as magnetic field source 8 runs through a portion of the sleeve 17 and passes through a rotary body 2 arranged adjacent to the electrical coil 9 and enters the coupling rod, which is composed of a likewise ferromagnetic material, and runs axially back to the next rotary body 2, where the magnetic field line enters again radially through a rotary body 2 and into the sleeve 17 and is closed there.

It is preferable for in each case two separate rotary body rows to be provided between two axially adjacent coils. Multiple magnetic circuits may be provided which are axially spaced apart from one another. Each magnetic circuit may for example comprise two rows of rotary bodies, which are arranged, in each case to the right and to the left of an electrical coil, so as to be distributed over the circumference.

It is however also possible for rotary bodies which are elongate in an axial direction to be provided, such that one end of an elongate cylindrical rotary body is flowed through by the magnetic field of the electrical coil 9 which is adjacent on one axial side, whereas the other end of the cylindrical rotary body 2 is flowed through by the magnetic field of the next electrical coil 9.

Centrally in the interior of the coupling rod 3, there may be formed a channel 21 which comprises branching channels which run for example to the individual electrical coils 9 in order to provide a targeted supply of electrical current to the individual electrical coils 9.

It is possible for between rings 18 to be provided in each case between the individual series of rotary bodies 2 in order to separate the individual magnetic circuits from one another.

Also clearly visible in FIG. 5 is the external thread 14 of the threaded spindle 4, which is in engagement with the internal thread 15 of the spindle nut 5. The external thread need not have the same pitch over the entire length; different pitches and pitch regions are also possible.

Figure 6:
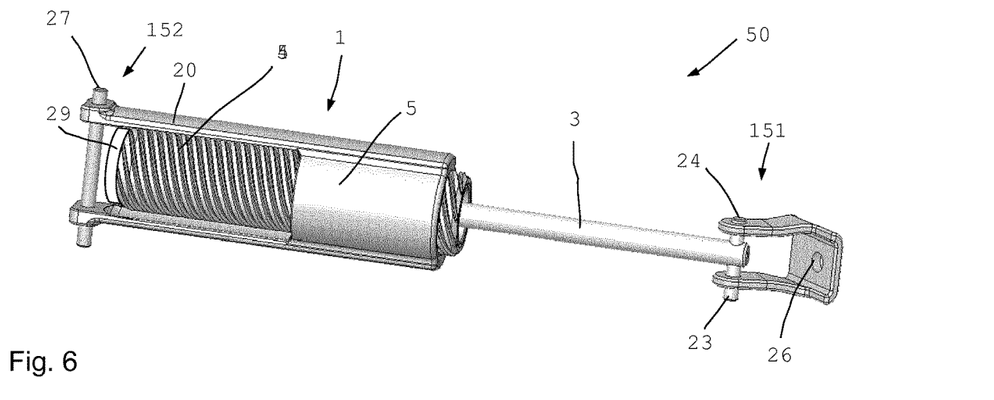
FIG. 6 shows a perspective view of another apparatus.

FIG. 6 shows another embodiment of an apparatus 50 with a rotary damper 1, wherein, in this case, too, a threaded spindle 4 which is rotatable on a coupling rod 3 is provided, which threaded spindle is in engagement with a rotationally fixedly held spindle nut 5. The spindle nut 5 is held on the fastening bracket 20. Attachment units 151 and 152 again serve for the fastening of the apparatus 50. In this case, too, the apparatus may be held so as to be pivotable about pivot axles 24 and a fastening bolt 27.

At the attachment unit 152, or adjacent thereto, it is possible here to see a motor 29, which can for example be supplied with electrical current through the coupling rod 3. The motor 29 serves for actively rotating the threaded spindle 4 and is itself held rotationally fixedly on the fastening bracket 20. Here, in the fastening bracket 20, there are formed grooves into which corresponding fingers of the motor 29 engage such that the motor 29 is displaceable axially along the fastening bracket 20 but is held rotationally fixedly therein. In this way, the motor 29 can be used to actively rotate the threaded spindle 4 such that an active length variation of the apparatus 50 is also possible. In this way, in the case of use as a door component 100, it is for example also possible for an automobile door to be actively or semi-actively partially or completely open or closed (in guided fashion).

Semi-active means that the electric motor assists (generates an active torque) the manually guided movement for example of a door by a user such that, at all opening and closing angles, and in particular taking into consideration different frictions, kinematic changes and spatial positions (vehicle is obliquely inclined), similar actuating forces have to be applied by the user (the user "guides" the door=guided door). Here, this semi-active mode can be assisted by means of the very fast-switching brakes of the brake unit, which is manifest in particular pleasant haptic opening and/or closing and/or actuation. This is particularly advantageous in an inclined position (on a gradient) when the door would automatically open owing to the force of gravity but has to be closed in the opposite direction. Here, fast switching between brake and drive must be performed in order to provide a good haptic feel. Here, fast and haptic advantageously means preferably in a few milliseconds and in continuously variable fashion, in order that smooth transitions are possible. Two-stage couplings (coupled/decoupled) lead to poor results (jerky movements and load peaks) which are not accepted by vehicle manufacturers from the premium segment.

Figure 7:
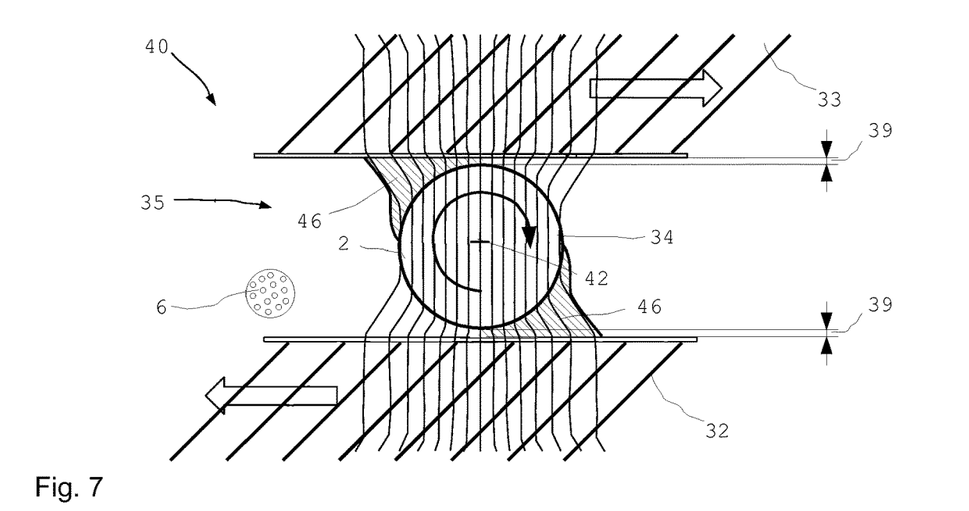
FIG. 7 shows a sectional diagrammatic sketch.

FIG. 7 shows a schematic diagrammatic sketch of the functioning of the magnetorheological transmission apparatus 40 with the basic principle of the rotary damper 1. This figure basically already appears in WO 2017/001696 A1. The description in this regard, and the entire content of WO 2017/001696 A1 is therefore also incorporated into the disclosure of the present invention.

FIG. 7 shows two components 32 and 33, the relative movement of which is to be damped, or influenced in targeted fashion, by means of the transmission apparatus 40. For this purpose, in a gap 35 between the components 32 and 33, there is arranged a multiplicity of rotary bodies 2, which are embedded into a magnetorheological fluid 6. The rotary bodies 2 function as magnetic field concentrators, which, in the presence of an applied magnetic field and a relative movement of the components 32 and 33 with respect to one another, leads to a wedge effect, wherein wedge-like regions 46 are formed in which the magnetorheological particles collect and, by means of the wedge effect, effectively brake an onward rotation of the rotary bodies 2 and a relative movement of the components 32 and 33 with respect to one another.

Here, the free spacing 39 between the rotary body 2 and the surface of the components 32 and 33 is basically larger than a typical or average or maximum particle diameter of a magnetorheological particle in the magnetorheological fluid. By means of this "MRF wedge effect", considerably more intense influencing is achieved than would be expected. This leads in particular to a high static force, which can be utilized as holding force.

The rotary dampers 1 shown here in the exemplary embodiments all function in accordance with this MRF wedge effect.

Figure 8:
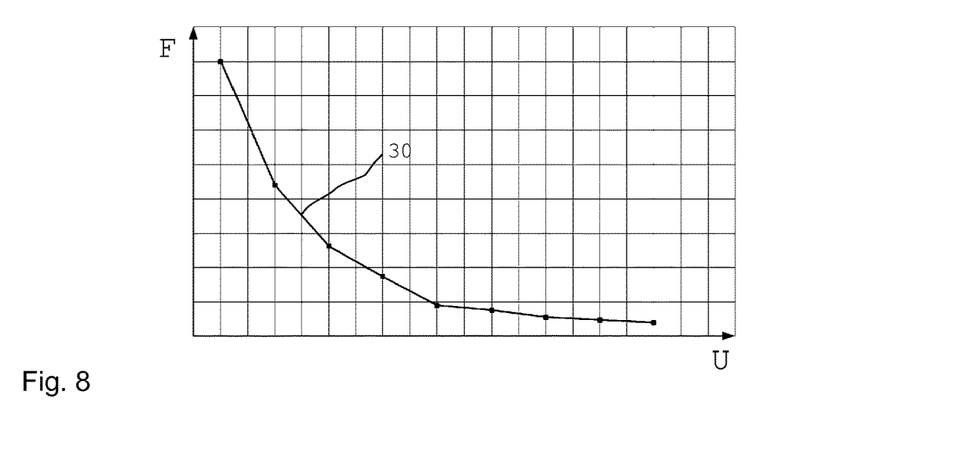
FIG. 8 shows the force profile of an apparatus as per FIG. 2 or 6.

The high static force can be effectively utilized as a holding force and can be advantageously utilized as shown in FIG. 8, which illustrates the force profile of the braking force of the magnetorheological transmission apparatus 40 or of the rotary damper 1, versus the rotational speed of the rotary bodies (and analogously also of the rotatable spindle unit). It can be seen that, when the rotary body 2 is at a standstill, a very high braking force is generated. If the user overcomes the braking force that holds the door open, the braking force considerably decreases with increasing speed even when the magnetic field continues to be applied, such that, even when the magnetic field is applied, the user can easily close the door after overcoming the sufficiently high holding force.

This effect has the result that, basically in any desired angle position, a high holding force is generated, which the user can however very easily overcome in order to close the door. A very convenient function is thus provided.

| List of reference designations: | |
| --- | --- |
| 1 | Rotary damper |
| 2 | Rotary body, rolling body |
| 3 | Coupling rod |
| 4 | Spindle unit, threaded spindle |
| 5 | Spindle unit, spindle nut |
| 6 | Magnetorheological fluid |
| 7 | Bearing |
| 8 | Magnetic field source |
| 9 | Electrical coil |
| 10 | Magnetic field |
| 11 | Coil holder |
| 12 | Threaded nut |
| 13 | Seal |
| 14 | External thread |
| 15 | Internal thread |
| 16 | Drilled nut |
| 17 | Sleeve |
| 18 | Intermediate ring |
| 19 | Screw-in part |
| 20 | Fastening bracket |
| 21 | Channel |
| 22 | Fastening bore |
| 23 | Angle sensor |
| 24 | Pivot axle |
| 25 | Joint |
| 26 | Fastening bore |
| 27 | Fastening bolt |
| 28 | Race |

-continued

| List of reference designations: | |
| --- | --- |
| 29 | Motor |
| 30 | Force profile |
| 32 | Component |
| 33 | Component |
| 34 | Separate part |
| 35 | Gap |
| 39 | Free spacing |
| 40 | Transmission apparatus |
| 42 | Axis of rotation |
| 46 | Wedge shape |
| 50 | Apparatus |
| 100 | Door component |
| 102 | Closed position |
| 103 | Open position |
| 151 | Attachment unit |
| 152 | Attachment unit |
| 154 | Door device |
| 160 | Sensor |
| 200 | Motor vehicle |

The invention claimed is:

1. An apparatus, comprising:
a damper device with two attachment units that are movable relative to one another, and a controllable rotary damper configured to dampen a relative movement of said two attachment units with respect to one another in controlled fashion;
two spindle units disposed between said two attachment units, said two spindle units being in engagement with one another, and one of said spindle units being a threaded spindle and another of said spindle units being a spindle nut;
said two spindle units including a first spindle unit rotatably fastened on a coupling rod connected to one of said two attachment units; and
a magnetorheological transmission apparatus arranged between said coupling rod and said first spindle unit in order to influence a rotational movement of said first spindle unit.

2. The apparatus according to claim 1, wherein an annular cylindrical cavity is formed radially between said coupling rod and said first spindle unit.

3. The apparatus according to claim 2, further comprising a cylindrical sleeve composed of a magnetically conductive material received in said first spindle unit and connected rotationally conjointly to said first spindle unit.

4. The apparatus according to claim 2, wherein said cavity is filled with a magnetorheological medium.

5. The apparatus according to claim 2, wherein said magnetorheological transmission apparatus comprises at least one electrical coil formed with windings wound around said coupling rod.

6. The apparatus according to claim 5, wherein said magnetorheological transmission apparatus comprises a magnetic circuit having an axial portion in said coupling rod, an axial portion in said cylindrical sleeve and/or said first spindle unit, said electrical coil and, on at least one axial side of said electrical coil, at least one rotary body which is arranged in a radial gap formed between said coupling rod and said first spindle unit.

7. The apparatus according to claim 6, wherein in each case at least one rotary body is arranged on both axial sides of said electrical coil.

8. The apparatus according to claim 6, wherein a multiplicity of rotary bodies are arranged, on at least one axial side of the electrical coil, so as to be distributed over a circumference of said coupling rod.

9. The apparatus according to claim 6, wherein said magnetic circuit comprises, on both axial sides of said electrical coil, rotary bodies arranged in the radial gap between said coupling rod and said threaded spindle.

10. The apparatus according to claim 1, wherein said spindle units are configured to convert a linear movement of said attachment units relative to one another into a rotational movement of said spindle units with respect to one another.

11. The apparatus according to claim 1, wherein, in an event of a relative movement of said attachment units with respect to one another, a relative axial position of said spindle units with respect to one another changes.

12. The apparatus according to claim 1, wherein said first spindle unit is a threaded spindle and a second spindle unit is a threaded nut.

13. The apparatus according to claim 12, wherein said magneto-rheological transmission apparatus is arranged radially within said first spindle unit.

14. The apparatus according to claim 12, wherein said threaded spindle is rotatable relative to said spindle nut and relative to the coupling rod.

15. The apparatus according to claim 1, further comprising an electrical connection cable for said electrical coil led through a channel formed in said coupling rod.

16. The apparatus according to claim 1, wherein said coupling rod is pivotable about a pivot axle oriented transversely with respect to said coupling rod.

17. The apparatus according to claim 1, wherein said first spindle unit is received on said coupling rod and axially fixed thereon.

18. The apparatus according to claim 1, further comprising a motor for driving said first spindle unit.

19. A door component, comprising:
 a controllable rotary damper and two attachment units that are movable relative to one another, wherein one of said two attachment units is connectable to a supporting structure and another of said two attachment units is connectable to a movable door in order to dampen a movement of the door between a closed position and an open position of the door in controlled fashion;
 two spindle units arranged between said two attachment units and being in engagement with one another, one of said spindle units being a threaded spindle and another of said spindle units being a spindle nut;
 said two spindle units including a first spindle unit rotatably fastened on a coupling rod connected to one of said attachment units; and
 a magnetorheological transmission apparatus arranged between said coupling rod and said first spindle unit in order to influence a rotational movement of said first spindle unit.

* * * * *